United States Patent [19]

Kobayashi et al.

[11] Patent Number: 5,767,827

[45] Date of Patent: Jun. 16, 1998

[54] REFLECTIVE TYPE ACTIVE MATRIX DISPLAY PANEL AND METHOD OF MANUFACTURING SAME

[75] Inventors: Tatsuru Kobayashi, Yokosuka; Toshihiko Nishihata, Yokohama, both of Japan

[73] Assignee: Victor Company of Japan, Ltd., Yokohama, Japan

[21] Appl. No.: 577,098

[22] Filed: Dec. 22, 1995

[30] Foreign Application Priority Data

Dec. 22, 1994 [JP] Japan .................. 6-336200

[51] Int. Cl.$^6$ ........................................... G02F 1/135
[52] U.S. Cl. ..................... 345/87; 437/30; 349/113
[58] Field of Search ................... 345/92, 87; 257/59, 257/72; 349/42, 138, 139, 143, 113; 437/30

[56] References Cited

U.S. PATENT DOCUMENTS

| | | | |
|---|---|---|---|
| 5,065,895 | 11/1991 | Kahn | 221/54 |
| 5,124,545 | 6/1992 | Takanashi et al. | 250/214 LA |
| 5,193,017 | 3/1993 | Iwai et al. | 349/43 |
| 5,445,996 | 8/1995 | Kodera et al. | 437/225 |
| 5,486,485 | 1/1996 | Kim et al. | 437/41 |
| 5,497,255 | 3/1996 | Yamazaki et al. | 349/116 |
| 5,548,425 | 8/1996 | Adachi et al. | 348/112 |
| 5,555,112 | 9/1996 | Oritsuki et al. | 349/46 |
| 5,571,373 | 11/1996 | Krishna et al. | 156/636.1 |
| 5,585,951 | 12/1996 | Noda et al. | 349/122 |

FOREIGN PATENT DOCUMENTS

| | | | |
|---|---|---|---|
| 03217825A | 9/1991 | Japan | G02F 1/135 |
| 06003693 | 1/1994 | Japan | G02F 1/135 |

OTHER PUBLICATIONS

"The Journal of the Institute of Television Engineers of Japan", pp. 544–549; Yoneharu Takuba, et al.; vol. 44, No. 5 (1990).

Primary Examiner—Mark R. Powell
Attorney, Agent, or Firm—Jacobson, Price, Holman & Stern, PLLC

[57] ABSTRACT

A reflective type active matrix display panel having pixel electrodes formed on a substrate is manufactured as follows: an insulating film is formed all over the substrate including the pixel electrodes; the surface of the insulating film is planarized by use of a polishing material including an etchant for etching the insulating film; and a reflective layer and a liquid crystal layer are formed on the planarized insulating film. The surfaces of the pixel electrodes are also planarized to have only the liquid crystal layer formed on the planarized pixel electrodes. The display panel has pixel transistors arranged into a matrix pattern on the substrate. Connected to the transistors are pixel electrodes and wirings arranged into a matrix pattern. Signals are applied to the pixel electrodes via the wirings. The transistors, pixel electrodes, and wirings are provided in a display pixel area on the substrate. The display panel also has drive circuits for scanning the signals, formed around the display pixel area.

15 Claims, 7 Drawing Sheets

REFLECTIVE TYPE ACTIVE MATRIX DISPLAY PANEL AND METHOD OF MANUFACTURING SAME

BACKGROUND OF THE INVENTION

1. Field of the Invention

The present invention relates to a reflective type active matrix display panel used as an enlarged projection reflective type liquid crystal display, for instance, and a method of, manufacturing the same display panel.

2. Description of the Prior Art

In the enlarged projection type active matrix display (liquid crystal projection type display apparatus), it is possible to manufacture an active matrix display panel of less defectiveness by microminiaturizing the respective pixels of the active matrix display panel for constituting the display portion, that is, by reducing the pixel area. The enlarged projection type active matrix display can be classified into two sorts of reflective type and transmissive type. At present, however, only the transmissive type has been put into practice use, and the reflective type active matrix display panel has been not so far of practical use due to less available efficiency as compared with that of the transmissive type.

Hereupon, in the case of the transmissive type active matrix display, since the area of a switching element occupied for each pixel increases relatively with the advance of microminiaturization, the aperture ratio is inevitably reduced, with the result that the light availability deteriorates markedly. Consequently, the transmissive type active matrix display panel is difficult to be microminiaturized, and thereby the panels less than one-inch size have been not so far put into practice. Further, the number of pixels is usually less than one hundred thousand.

Further, in the case of the enlarged projection type active matrix display, the size, weight and cost of the optical system therefor increased remarkably with increasing active matrix panel size. Therefore, there exists a limit in use of the transmissive type active matrix display panel, because of the difficulty of the high resolution and microminiaturization on the basis of its principle.

Accordingly, the use of the reflective type active matrix display panel has been considered. In the case of the reflective type active matrix display panel, since each pixel transistor can be formed under each pixel electrode, it is possible to utilize all the pixel area other than the portion required to electrically isolate (i.e., insulate) the respective pixels, so that the aperture ratio can be increased.

In the conventional reflective type active matrix display panel, however, the reflection factor from the panel is small due to the roughness on the surfaces of the pixel electrode and the reflective layer, with the result that it has been so far impossible to obtain a brightness (light intensity) required for the practical use.

To overcome this problem, for instance, U.S. Pat. No. 5,056,895 discloses such a method that: after the pixel electrodes have been formed, an organic insulation substance (polyimide) is applied onto the surfaces of the pixel electrodes, and then a reflective film is formed for planarization (leveling) of the surface of the display panel. Even if a liquid such as polyimide is simply applied on the surfaces of the pixel electrodes, however, since the base surface (the pixel electrodes) thereof is relatively rough, it is extremely difficult to finish the surface of the display panel into a mirror surface.

Further, THE JOURNAL OF THE INSTITUTE OF TELEVISION ENGINEERS OF JAPAN Vol. 44, No. 5, pp. 544 to 549 (1990) discloses such a technology that the surfaces of the pixel electrodes are finished into mirror surface by mechanically polishing the surfaces thereof. In this method, however, since the surfaces of the pixel electrodes are very easy to be scratched, when the pixel electrodes are directly polished, there exists a possibility that the pixel electrodes are easily damaged. In addition, when the pixel electrodes are simply polished mechanically, the polished surfaces thereof are finely scratched. Therefore, when the pixels are used as the reflective type active matrix display, there exists the case where scratch noise is generated. As a result, it has been impossible to perfectly planarize the surfaces of the pixel electrodes by only the mechanical polishing process.

As described above, the transmissive type active matrix display panel is difficult to be microminiaturized, so that it has been difficult to manufacture the small-sized enlarged projection type liquid crystal display of high resolution. On the other hand, the reflective type active matrix display panel is small in reflection factor from the panel, so that it has been difficult to obtain a brightness high enough for practical use. In addition, the study of increasing the reflection factor of the reflective type active matrix display panel has not been so far made sufficiently.

SUMMARY OF THE INVENTION

Accordingly, it is the object of the present invention to provide a reflective type active matrix display panel of high reflection factor, and thereby to realize a small-sized enlarged projection type liquid crystal display of high resolution.

To achieve the above-mentioned object, the present invention provides a method of manufacturing a reflective type active matrix display panel having pixel electrodes formed on a substrate, comprising the steps of: forming an insulating film all over the substrate including the pixel electrodes; planarizing a surface of the insulating film by use of a polishing material including an etchant for etching the insulating film; and forming a reflective layer and a liquid crystal layer on the planarized insulating film.

The surfaces of the pixel electrodes may also be planarized by use of a polishing material including an etchant for etching the pixel electrodes.

The present invention further provides a method of manufacturing a reflective type active matrix display panel having pixel electrodes formed on a substrate, comprising the steps of: forming an insulating film all over the substrate including the pixel electrodes; planarizing surfaces of the pixel electrodes and the insulating film by use of a polishing material including an etchant for etching the insulating film and the pixel electrode; and forming a liquid crystal layer on the planarized pixel electrodes.

In the manufacturing methods, the etchant is may be of at least either of potassium hydroxide and ammonium hydroxide. Further, the planarizing material may be selected from the group consisting of fumed silica, colloidal silica, and cerium oxide.

The present invention provides a reflective type active matrix display panel, comprising: semiconductor pixel transistors arranged into a matrix pattern on a substrate; pixel electrodes connected to the transistors; an insulating film formed all over the substrate including the pixel electrodes, a surface of the insulating film being planarized by use of a polishing material including an etchant for etching the insulating film; a reflective layer and a liquid crystal layer formed on the planarized insulating film; wirings arranged into a matrix pattern and connected to the transistors, signals being applied to the pixel electrodes via the wirings and the transistors, wherein the transistors, pixel electrodes, and wirings are provided in a display pixel area on the substrate; and drive circuits for scanning the signals, formed around the display pixel area.

The present invention further provides a reflective type active matrix display panel, comprising: semiconductor pixel transistors arranged into a matrix pattern on a substrate; pixel electrodes connected to the transistors; an insulating film formed all over the substrate including the pixel electrodes, surfaces of the pixel electrodes and the insulating film being planarized by use of a polishing material including an etchant for etching the insulating film and the pixel electrodes; a liquid crystal layer formed on the planarized pixel electrodes; wirings arranged into a matrix pattern and connected to the transistors, signals being applied to the pixel electrodes via the wirings and the transistors, wherein the transistors, pixel electrodes, and wirings are provided in a display pixel area on the substrate; and drive circuits for scanning the signals, formed around the display pixel area.

In this display panel, a reflective film may be formed between the liquid crystal layer and the planarized pixel electrodes. Further, another insulating film may be formed between the reflective film and the planarized pixel electrodes.

In the display panels, dummy pixel transistors may be formed between the display pixel area and the drive circuits. Further, insulating barriers may be formed between the display pixel area and the drive circuits.

DETAILED DESCRIPTION OF THE EMBODIMENTS

Preferred embodiments of the reflective type active matrix display panel and the method of manufacturing the same display panel according to the present invention will be described hereinbelow with reference to the attached drawings.

Figure 1:
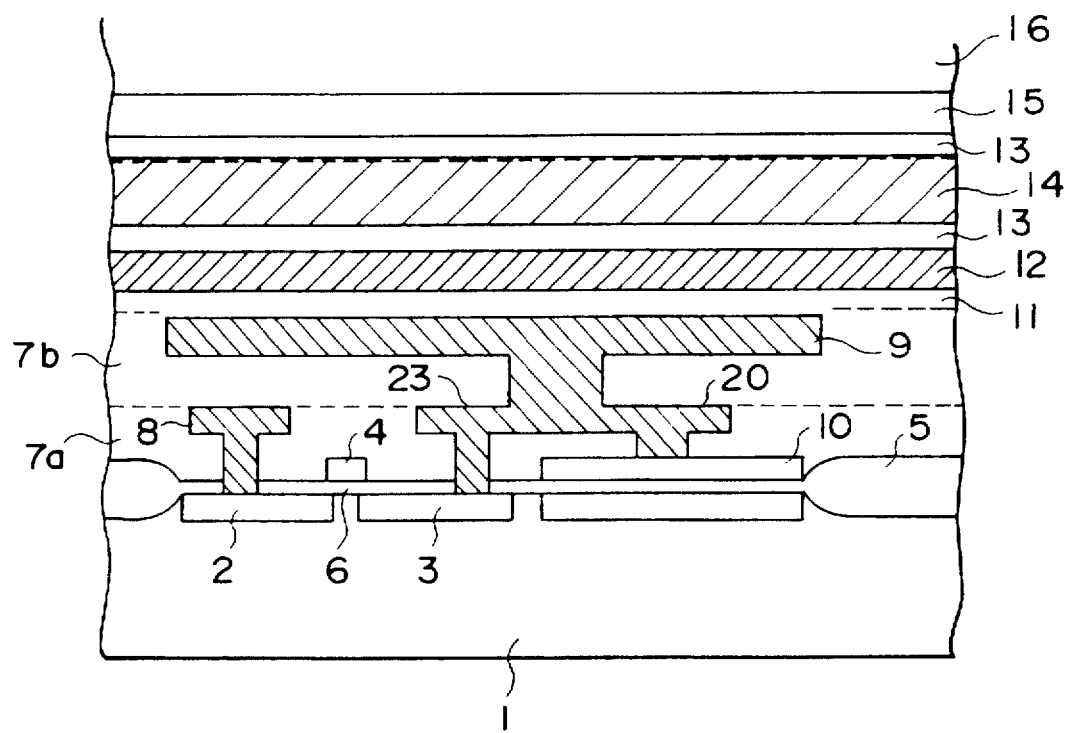
FIG. 1 is a cross-sectional view showing a preferred embodiment of a reflective type active matrix display panel according to the present invention.

FIG. 1 is a cross-sectional view showing an preferred embodiment of the reflective type active matrix display panel according to the present invention. Further, in this embodiment, a monocrystal silicon substrate is used. Without being limited only thereto, however, an insulating material (e.g., glass) and another semi-insulating material can be also used.

In FIG. 1, impurities such as boron, boron difluoride ($BF_2$), arsenic, phosphorus, etc., are added to a p-type silicon substrate 1. On the substrate 1, a source 2 and a drain 3 are formed. A gate signal line (polysilicon) 4 is formed over a gate via a gate insulating film (oxide film) 6. A pixel transistor consists of the source 2, drain 3, and gate. A plurality of pixel transistor are arranged into matrix pattern (not shown) on the substrate 1. Two adjacent pixels are electrically isolated from each other by a field insulating film (oxide film) 5 and two interlayer insulating films (oxide films) 7a and 7b. Further, a video signal is applied through a data signal line 8 made of aluminum, and the applied video signal is hold by a pixel electrode 9 made of aluminum. A plurality of gate and data signal lines are arranged into matrix pattern (not shown) on the substrate 1. In addition, in FIG. 1, the pixel portion includes an auxiliary capacitance 10 for holding the charge of the pixel electrode 9, and a passivation film (oxide film) 11 deposited as a transistor protective film. The passivation film 11 is a silicon dioxide ($SiO_2$) film containing phosphorous or boron and constructed by a film such as undoped silicate-grass (USG), phosphosilicate glass (PSG), borophosphosilicate glass (BPSG), etc.

In the manufacturing process of the above-mentioned pixel portion of the display panel, after the interlayer insulating film 7a has been formed and further a contract hole has been formed, the data signal line 8, a drain electrode 23, an auxiliary capacitance electrode 20, etc are formed by spattering. After that, the other interlayer insulating film 7b has been formed again on the abovementioned portions and further a through hole has been formed, the pixel electrode 9 is formed thereon.

As described above, since the pixel electrode 9 is formed in such a way as to cover the pixel transistor and the auxiliary capacitance 10, it is possible to from the active matrix display panel of high aperture ratio. Further, the substrate portion of the reflective type active matrix display panel can be formed by forming the passivation film 11 as the protective film for the pixel transistor on the pixel electrode 9. In addition, a dielectric mirror 12 of multilayer film (referred to as a dielectric mirror film, herein after), a liquid crystal orientation film 13, a liquid crystal 14, another liquid crystal orientation film 13, a transparent electrode 15, and a glass substrate 16 are formed in sequence on the passivation film 12, to complete the reflective type active matrix display panel.

Here, in order to form the reflective type active matrix display panel of high reflection factor (coefficient), it is necessary to prevent the reflected light from being scattered by planarizing (leveling) the base surface of the passivation film 11 on which the dielectric mirror film 12 is evaporated; that is, by forming the dielectric mirror film 12 extremely flat.

For this purpose, the passivation film 11 (the base surface on which the dielectric mirror film 12 is to be evaporated) is etched into a mirror surface, by use of a polishing material including an etchant (referred to as chemical mechanical polish (CMP) technique, hereinafter).

Figure 2A:
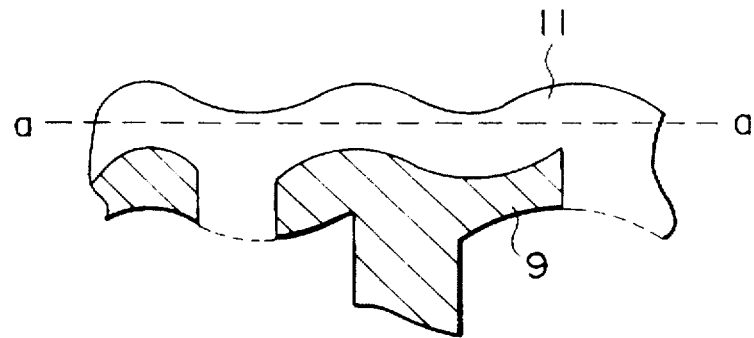
FIGS. 2A and 2B show fragmentary cross-sectional views explaining a preferred embodiment of a method of manufacturing the reflective type active matrix display panel shown in FIG. 1.
Figure 2B:
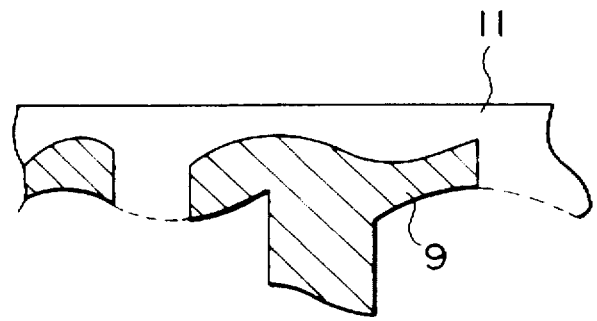

In more detail, FIG. 2A shows a cross-sectional view showing the passivation film 11 obtained before polished by the CMP technique, and FIG. 2B shows a cross-sectional view showing the passivation film 11 obtained after polished by the CMP technique. As shown, the uneven surfaces of the passivation film 11 can be polished by use of the polishing material including an etchant for etching the passivation film 11, until it can be finished into a mirror surface as shown in FIG. 2B. Here, acid such as potassium hydroxide (KOH) and ammonium hydroxide ($NH_4OH$) is used as the etchant for etching the passivation film 11, and fumed silica, colloidal silica, cerium oxide, etc. are used as the polishing material.

This polishing technique can finish the surface of the passivation film 11 into a mirror surface (which cannot be obtained by only etching) without forming any fine scratches caused by mechanical polishing, so that it is possible to prevent the pixel electrode 9 from being damaged. As a result, when the passivation film 11 is polished by this method, since the dielectric mirror film 12 can be deposited on the passivation film 11 under an extremely planarized condition, it is possible to obtain a high reflection factor.

Figure 3A:
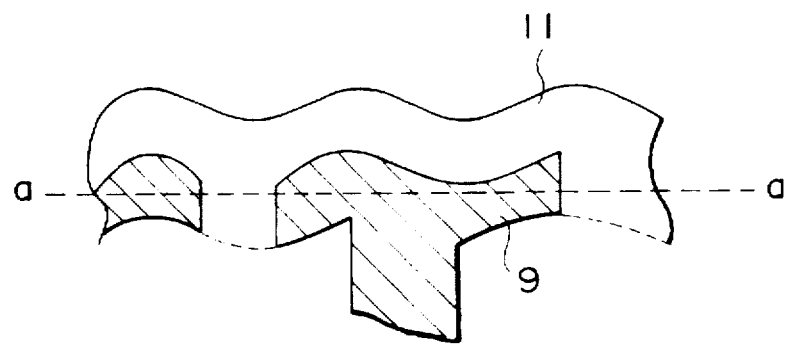
FIGS. 3A and 3B show fragmentary cross-sectional views explaining another preferred embodiment of a method of manufacturing the reflective type active matrix display panel shown in FIG. 1.
Figure 3B:
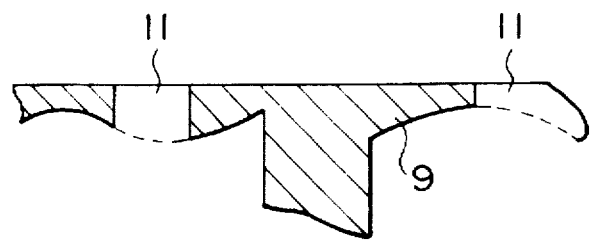

In contrast to this, FIG. 3A shows a cross-sectional view showing the passivation film 11 and the pixel electrode 9 obtained before polished by the CMP technique, and FIG. 3B shows a cross-sectional view showing the passivation film 11 and the pixel electrode 9 obtained after polished by the CMP technique. As shown, the uneven surfaces of the passivation film 11 and the pixel electrode 9 can be both polished simultaneously by use of the polishing material including an etchant for etching both the passivation film 11 and the pixel electrode 9 at the same time, until both can be finished into a mirror surface as shown in FIG. 3B. As a result, it is also possible to use the pixel electrode 9 itself as the reflecting layer. In this case, as the etchant, an etching material for etching both the oxide film and the metal or a mixture of two etchants for etching both are is used. Further, it is also possible to use the two etchants separately at two different stages of the manufacturing process. For instance, potassium hydroxide (KOH) or ammonium hydroxide ($NH_4OH$) can be used as the etchant, and fumed silica, colloidal silica, cerium oxide, etc., are used as the polishing material, as already described.

Figure 4:
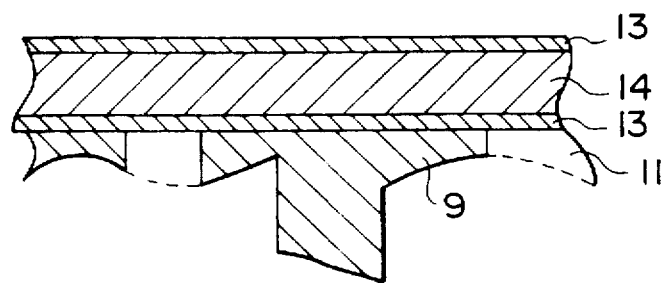
FIG. 4 is a cross-sectional view showing the pixel electrode portion of the reflective type active matrix display panel shown in FIG. 1.

In this process, since the pixel electrode 9 and the passivation film 11 can be both planarized, it is possible to form a liquid crystal orientation film 13 directly on the pixel electrode 9, as shown in FIG. 4, so that the impedance thereof can be reduced, as compared with the conventional pixel electrode 9 and thereby the signal voltage can be reduced to that extent. Further, since the pixel electrode 9 can be brought into contact with the liquid crystal 14 under more flat condition, the electric field applied to the liquid crystal 14 can be more uniformalized. Further, since the process of evaporating the dielectric mirror film 12 can be omitted, the number of process steps can be decreased, so that the manufacturing cost thereof can be reduced consequently.

Figure 5:
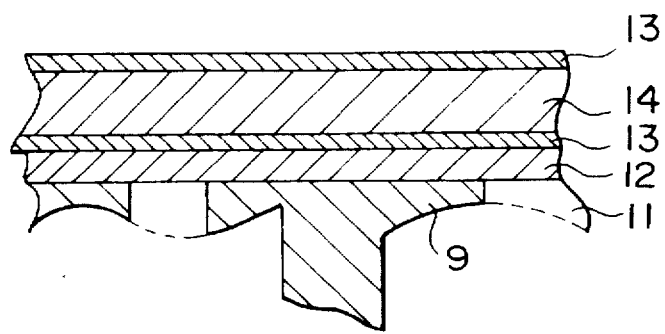
FIG. 5 is a fragmentary cross-sectional view showing another preferred embodiment of the reflective type active matrix display panel according to the present invention.

Further, as shown in FIG. 5, it is also possible to evaporate the dielectric mirror film 12 on the planarized pixel electrode 9 and then to form the liquid crystal orientation film 13 and the liquid crystal 14 in sequence thereof. In this case, the electric field applied to the liquid crystal 14 is not only uniformalized in the same way as shown in FIG. 4, but also there exists such an effect that the light shading characteristics to the active matrix substrate can be improved so that it is possible to prevent the pixel transistor from being operated erroneously by a light leak current.

Figure 6:
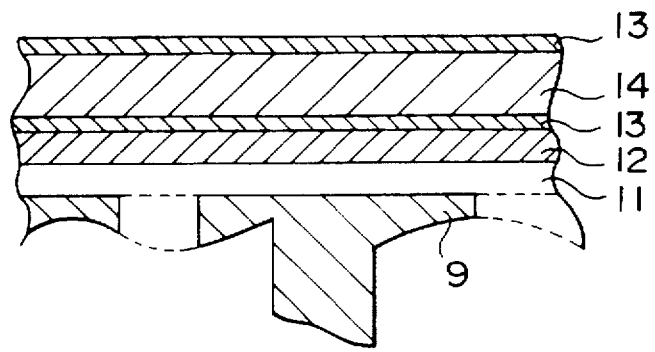
FIG. 6 is a fragmentary cross-sectional view showing still another preferred embodiment of the present invention.

Further, as shown in FIG. 6, when the passivation film 11 is formed again by deposition between the planarized pixel electrode 9 and the dielectric mirror film 12 as a transistor protection film, it is possible to uniformalize the electric field applied to the liquid crystal 14, so that an excellent picture can be obtained.

On the other hand, when the reflective type active matrix display panel surface is polished in accordance with the above-mentioned CMP technique, there exists a tendency that the peripheral portion thereof is inclined or partially rounded. This will be explained in further detail with reference to FIGS. 7A and 7S.

Figure 7A:
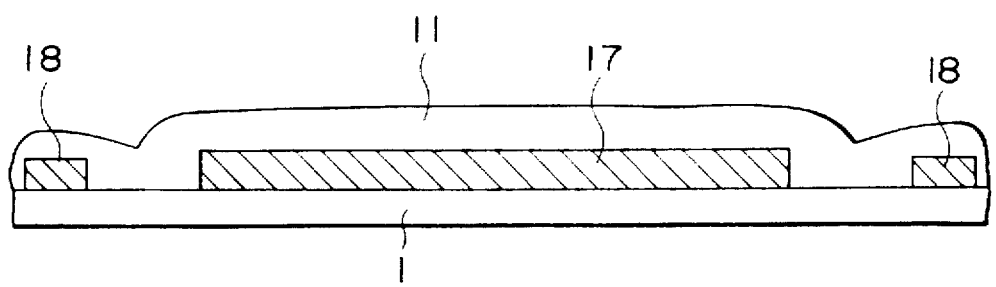
FIGS. 7A and 7B are cross-sectional views for assistance in explaining the peripheral inclination formed on the panel surface of the reflective type active matrix display panel.
Figure 7B:
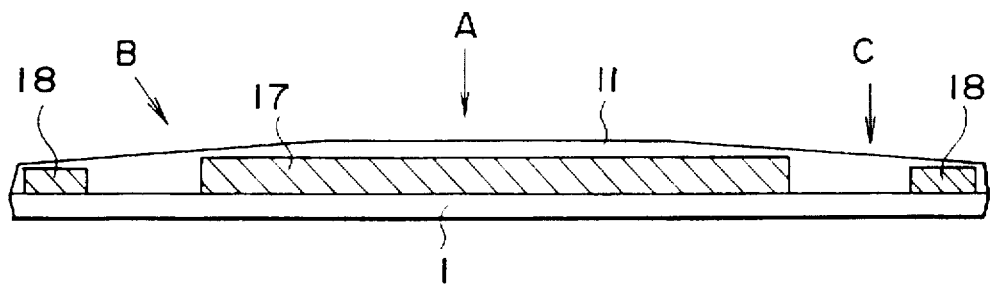

As shown in FIG. 7A, in the case of the reflective type active matrix display panel, since the thickness of a display pixel area 17 is different from that of signal-scanning drive circuits 18 formed in the peripheral portions of the pixel area 17, there exists a height (thickness) difference on the surface of the panel. Therefore, when the passivation film (oxide film) 11 of different height is polished by the polishing film) 11 including the etchant for etching the oxide film, the middle portion (indicated by an arrow A) of the display pixel area 17 is flattened, however, the peripheral portions (indicated by arrows B and C) tend to be inclined as shown in FIG. 7B.

In this case, since the passivation film 11 in the peripheral portions of the display pixel area 17 is excessively polished, there exist the cases where the pixel transistors in the display pixel area 17 are damaged or where light is scattered in the peripheral portions of the display pixel area 17 so that the light reflection factor is reduced.

Figure 8:
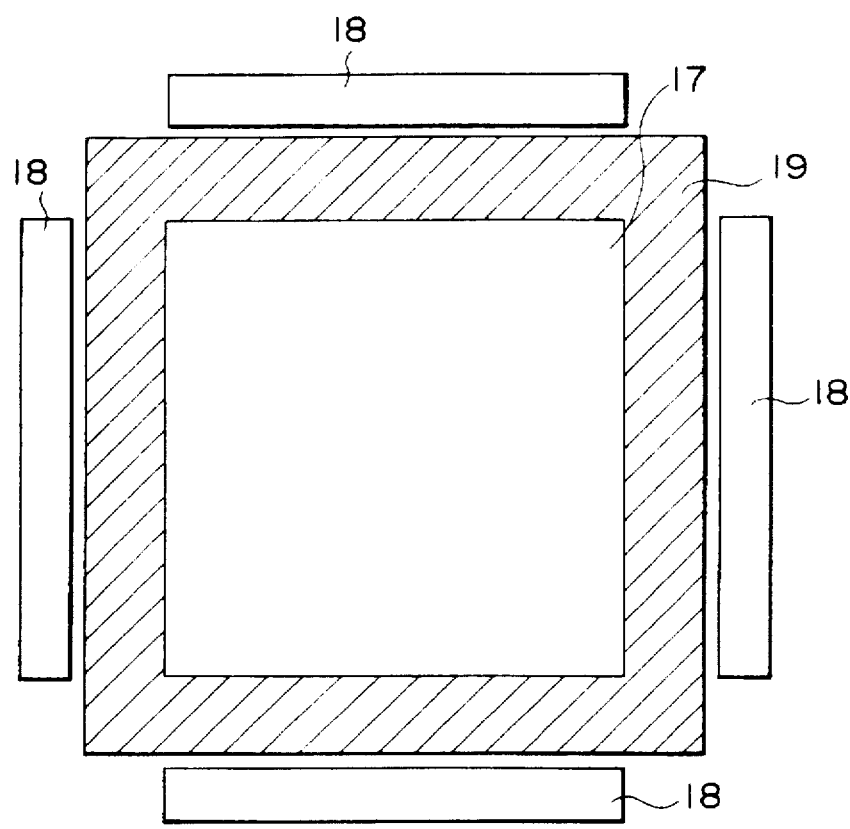
FIG. 8 is a plane view showing still another preferred embodiment of the reflective type active matrix display panel according to the present invention.
Figure 9A:
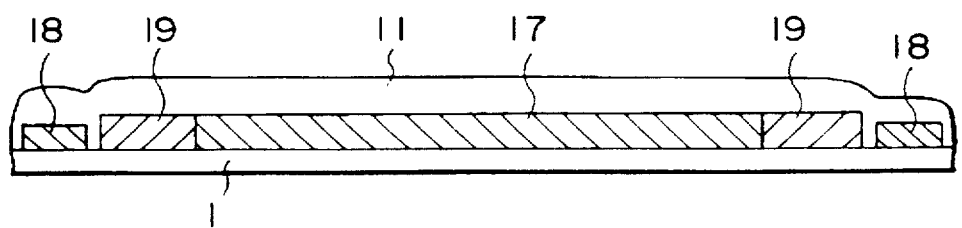
FIGS. 9A and 9B are cross-sectional views for assistance in explaining prevention of the peripheral inclination to be formed on the panel surface of the reflective type active matrix display panel.
Figure 9B:
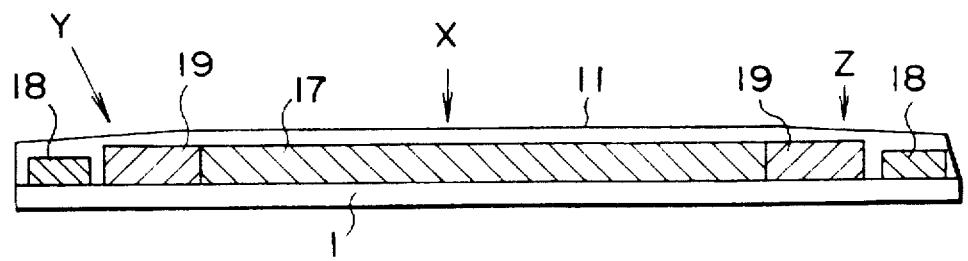

To prevent this problem, in the present invention, a plurality of dummy pixel transistors 19 (which do not contribute to the picture display) are arranged between the display pixel area 17 and each of the signal-scanning drive circuits 18 so as to enclose the display pixel area 17, as shown in FIG. 8 and FIG. 9A. FIG. 8 is a plan view of the reflective type active matrix display panel formed by the manufacturing processes described with reference to FIGS. 2A to 6. In this construction, although the surface of the passivation film 11 is slightly inclined outward (indicated by arrows Y and Z) beginning from the position at which the height difference exists between the dummy pixel transistors 19 and the signal-drive scanning circuit 18, as shown in FIG. 9B, it is possible to maintain the planarized surface (indicated by an arrow X) in the display pixel area 17. In other words, since the film thickness of the passivation film 11 is reduced only over the dummy pixel transistors 19, although the dummy pixel transistors 19 may be damaged, it is possible to prevent the pixel transistors within the display pixel area 17 (which contribute to the picture display) from being scratched. Further, the light reflection factor can be prevented from being reduced.

Figure 10A:
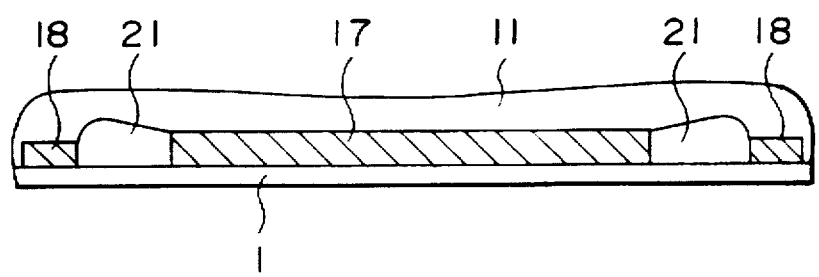
FIGS. 10A and 10B are fragmentary cross-sectional view showing still another referred embodiment of the reflective type active matrix display panel according to the present invention and for assistance in explaining prevention of the peripheral inclination to be formed on the panel surface.
Figure 10B:
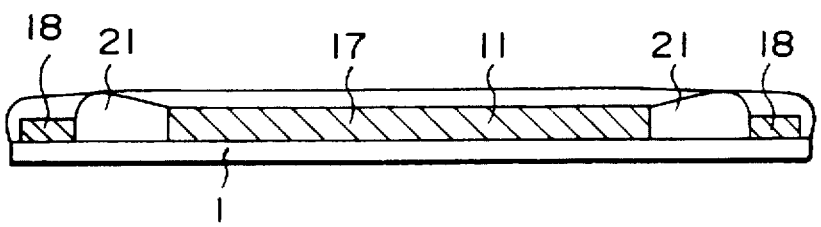

Further, as shown in FIG. 10A, instead of forming the above-mentioned dummy pixel transistors 19 in the periphery of the display pixel area 17, it is also possible to obtained the same effect when an insulating barrier 21 (e.g., oxide film) of the same height as the display pixel area 17 is formed in the periphery of the display pixel area 17. In this method, although the film thickness of the passivation film 11 is reduced only over the insulating film barrier 21, it is possible to prevent the surface planarization from being deteriorated all over the region of the display pixel area 17 (which contributes to the picture display).

As described above, in the method of manufacturing the reflective type active matrix display panel according to the present invention, since the surface of the insulating film formed all over the surface of the substrate including the pixel electrodes is planarized by polishing the surface by use of a polishing material including an etchant for etching the insulating film, it is possible to polish both the insulating film and the reflective layer (formed on the insulating film) extremely flat, so that a high reflective factor can be secured and further the electric field applied to the liquid crystal can be uniformalized, thus realizing an enlarged projection type reflection liquid crystal display panel of high brightness and high resolution.

Further, when the surfaces of the insulating film and the pixel electrode are both polished for planarization, by use of the polishing material including the etchant for etching both the insulating film and the pixel electrode, it is possible to finish the pixel electrode into mirror surface without scratching the pixel electrode.

As a result, light can be reflected by the pixel electrode without scattering, and further the liquid crystal layer can be formed directly on the pixel electrode. In this case, since the impedance between the pixel electrode and the liquid crystal layer can be reduced, the signal voltage can be decreased. In addition, since the reflecting layer can be eliminated, the manufacturing cost thereof can be reduced.

Further, when the dummy pixel transistors or the insulating barrier (both do not contribute to the picture display) is formed between the periphery of the display pixel area and the signal-scanning drive circuits, it is possible to prevent the peripheral portion of the display pixel area from being inclined (which would otherwise be formed during the insulating film polishing process), with the result that it is possible to prevent the pixel transistors from being scratched or light from being scattered in the periphery of the display pixel area (which causes a reduction of the light reflection factor).

What is claimed is:

1. A method of manufacturing a reflective type active matrix display panel having pixel electrodes formed on a substrate, comprising the steps of:
   forming an insulating film all over the substrate including the pixel electrodes;
   planarizing a surface of the insulating film by use of a polishing material including an etchant for etching the insulating film; and
   forming a reflective layer and a liquid crystal layer on the planarized insulating film.

2. The method according to claim 1, further comprising the step of planarizing surfaces of the pixel electrodes by use of a polishing material including an etchant for etching the pixel electrodes.

3. The method according to claim 1, wherein the etchant is either of potassium hydroxide and ammonium hydroxide.

4. The method according to claim 1, wherein the polishing material is selected from the group consisting of fumed silica, colloidal silica, and cerium oxide.

5. A method of manufacturing a reflective type active matrix display panel having pixel electrodes formed on a substrate, comprising the steps of:
   forming an insulating film all over the substrate including the pixel electrodes;
   planarizing surfaces of the pixel electrodes and the insulating film by use of a polishing material including an etchant for etching the insulating film and the pixel electrode; and
   forming a liquid crystal layer on the planarized pixel electrodes.

6. The method according to claim 5, wherein the etchant is at least either of potassium hydroxide and ammonium hydroxide.

7. The method according to claim 5, wherein the polishing material is selected from the group consisting of fumed silica, colloidal silica, and cerium oxide.

8. A reflective type active matrix display panel, comprising:
   semiconductor pixel transistors arranged into a matrix pattern on a substrate;
   pixel electrodes connected to the transistors;
   an insulating film formed all over the substrate including the pixel electrodes, a surface of the insulating film being planarized by use of a polishing material including an etchant for etching the insulating film;
   a reflective layer and a liquid crystal layer formed on the planarized insulating film;
   wirings arranged into a matrix pattern and connected to the transistors, signals being applied to the pixel electrodes via the wirings and the transistors, wherein the transistors, pixel electrodes, and wirings are provided in a display pixel area on the substrate; and
   drive circuits for scanning the signals, formed around the display pixel area.

9. The display panel according to claim 8, further comprising dummy pixel transistors formed between the display pixel area and the drive circuits.

10. The display panel according to claim 8, further comprising insulating barriers formed between the display pixel area and the drive circuits.

11. A reflective type active matrix display panel, comprising:
   semiconductor pixel transistors arranged into a matrix pattern on a substrate;
   pixel electrodes connected to the transistors;
   an insulating film formed all over the substrate including the pixel electrodes, surfaces of the pixel electrodes and the insulating film being planarized by use of a polishing material including an etchant for etching the insulating film and the pixel electrodes;
   a liquid crystal layer formed on the planarized pixel electrodes;
   wirings arranged into a matrix pattern and connected to the transistors, signals being applied to the pixel electrodes via the wirings and the transistors, wherein the transistors, pixel electrodes, and wirings are provided in a display pixel area on the substrate; and
   drive circuits for scanning the signals, formed around the display pixel area.

12. The display panel according to claim 11, further comprising a reflective film formed between the liquid crystal layer and the planarized pixel electrodes.

13. The display panel according to claim 12, further comprising another insulating film formed between the reflective film and the planarized pixel electrodes.

14. The display panel according to claim 11, further comprising dummy pixel transistors formed between the display pixel area and the drive circuits.

15. The display panel according to claim 11, further comprising insulating barriers formed between the display pixel area and the drive circuits.

* * * * *